United States Patent [19]
Martenson et al.

[11] Patent Number: 5,401,296
[45] Date of Patent: Mar. 28, 1995

[54] PRECIOUS METAL EXTRACTION PROCESS

[76] Inventors: Irvin Martenson, 782 Shadow Grove, Brea, Calif. 92621; Samuel A. Mathis, 9661 Dacosta St., Downey, Calif. 90240

[21] Appl. No.: 266,563

[22] Filed: Jun. 28, 1994

[51] Int. Cl.$^6$ ............................................. C22B 3/44
[52] U.S. Cl. ...................................... 75/741; 423/22; 423/38
[58] Field of Search ....................... 75/741; 423/22, 38

[56] References Cited

U.S. PATENT DOCUMENTS

| | | | |
|---|---|---|---|
| 267,723 | 11/1882 | Schaeffer | 75/741 |
| 5,304,359 | 4/1994 | Duyvesteyn et al. | 423/38 |

FOREIGN PATENT DOCUMENTS

| | | | |
|---|---|---|---|
| 8200478 | 2/1982 | WIPO | 75/741 |

*Primary Examiner*—Malvyn J. Andrews
*Attorney, Agent, or Firm*—Plante & Strauss

[57] ABSTRACT

There is disclosed a process useful for the extraction of gold, silver, and the platinum metals from precious metal containing ores which poses no threat to the environment or the ground water. The process utilizes sodium bromide, sodium chloride, and potassium monopersulfate to react with a water slurry of the precious metal containing ore which has been reduced to a minimum particle size of 250 mesh. The leaching out of the gold, silver, and the platinum metals occurs when the oxidation-reduction potential is maintained at +600 to +900 with the pH at 3.2 to 3.6. After the precious metals have been dissolved into solution, the ore tailings are filtered and discarded. The pregnant leach liquor is pumped to a holding tank where it is subsequently reacted with a solution of sodium hydroxide and sodium borohydride at a pH of 8.2 to 8.6 and the oxidation-reduction parameter held at −550 to −650. A black suspension of the mixed precious metals precipitate out of solution where it is collected and transferred to the refinery for separation and purification by standard procedures. The "barren" leach liquor filtrate is then electrically treated, and make-up chemicals of sodium bromide, sodium chloride, and potassium monopersulfate are added for re-use with the next ore batch.

17 Claims, 1 Drawing Sheet

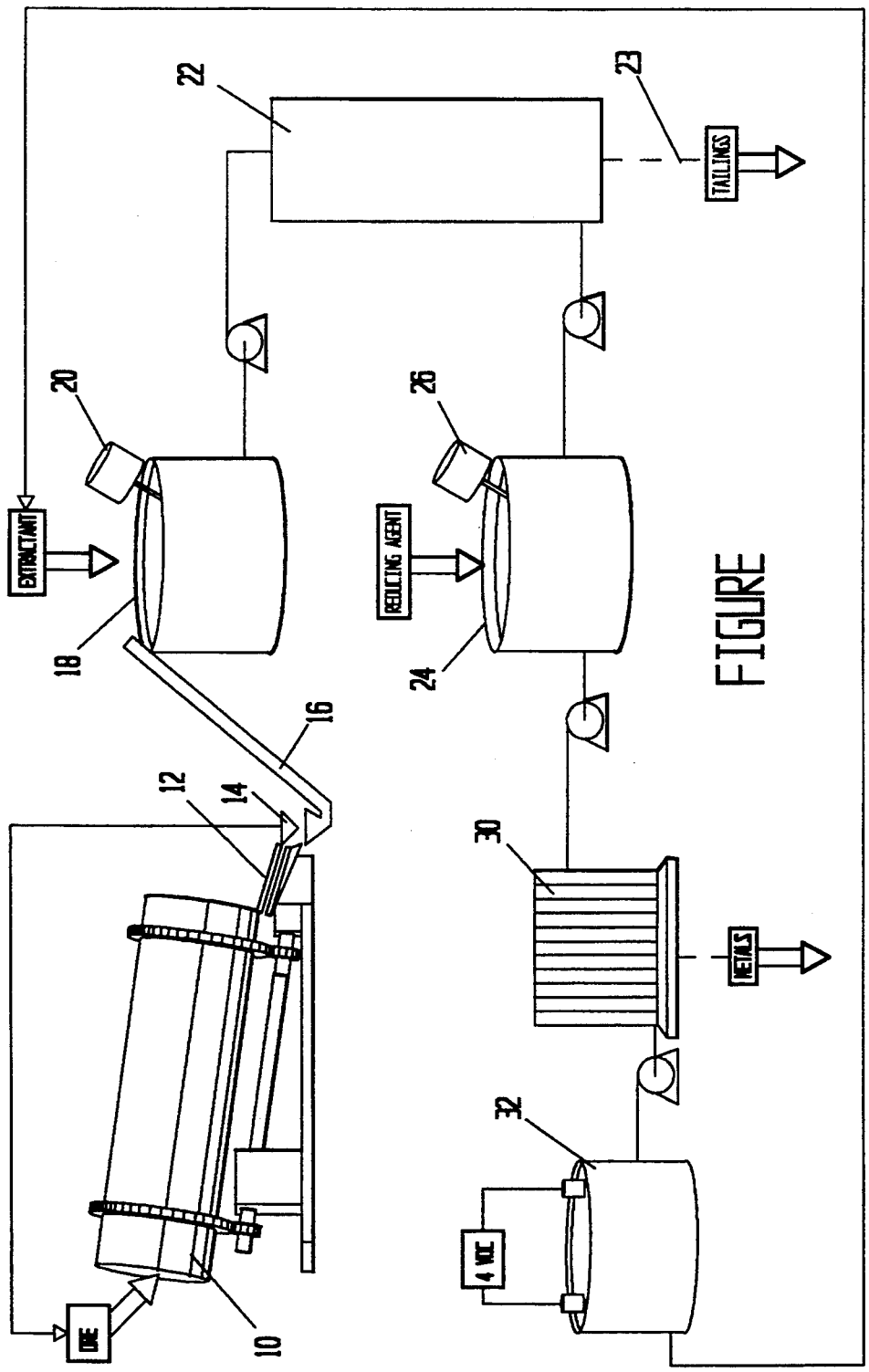

PRECIOUS METAL EXTRACTION PROCESS

BACKGROUND OF THE INVENTION

1. Field of Invention

This invention relates to a chemical composition and a method for its use to extract gold, silver, and the platinum metals from precious-metal-containing ores.

2. Brief Statement of the Prior Art

Recovery of gold, silver, and the platinum metals from ores has traditionally been achieved by extraction with cyanides, by mercury amalgamation, flotation, and electrolytic separation and electrostatic separation. In the latter method, the metals in dry ore are electrostatically charged, usually passing a high velocity arc through the ore and then recovered on an oppositely charged collector. In electrolytic separation, the metals in an ore are dissolved and then electroplated on an oppositely charged electrode. Many other methods of separation include gravimetric differential density separation, chlorination, ion exchange, and other procedures both chemical and mechanical.

All of the aforementioned processes are costly, time consuming, and inefficient as they recover only a low fraction of the precious metals in the ore, or require the use of toxic chemicals which can be injurious to plant personnel, and damaging to plant and animal life when discharged to the environment.

Accordingly, there exists a need for a method which achieves greater recoveries of precious metals than currently practiced methods. There is further a need for a simple, low-cost, and efficient method for the extraction of gold, silver, and the platinum metals from precious-metal-containing ores without the use of toxic chemicals such as mercury, cyanides and strong acid leaches. A method is desired which is less costly in plant cost and labor than conventionally used mechanical procedures. Additionally a need exists for a process where precious metals can be obtained directly as free metals ready for refinery separation and in particular a process which poses no threat to the environment or ground water.

OBJECTIVES OF THE INVENTION

It is an objective of this invention to provide a method which achieves greater recoveries of precious metals than currently practiced methods.

It is an added objective of this invention to provide a composition of innocuous chemicals useful as an extractant for precious metals in ores.

It is a further objective of this invention to provide a simple, low-cost, and efficient method for the extraction of gold, silver, and the platinum metals from precious-metal-containing ores without the use of toxic chemicals such as mercury, cyanides and strong acid leaches.

It is a still further objective of this invention to provide a method which is less costly in plant cost and labor than conventionally used mechanical procedures.

It is also an objective of this invention to provide a process where precious metals can be obtained directly as free metals ready for refinery separation.

It is likewise an objective of this invention to provide a precious metal recovery method which poses no threat to the environment or ground water.

BRIEF DESCRIPTION OF THE INVENTION

This invention comprises a method for the extraction of gold, silver, and the platinum metals (ruthenium, rhodium, palladium, osmium, iridium, and platinum) from precious-metal-containing ores by the use of low cost and relatively small quantities of common chemicals, non-toxic to the environment or ground water. There are no corrosive chemical odors. The first step of the method is comminution of the precious-metal-bearing ores to increase the surface area of the ore and to form a water slurry containing two weight parts water to one part ore. The next step of the method comprises the addition, to the ore slurry, an extraction composition containing sodium bromide, sodium chloride, and potassium monopersulfate under conditions of pH and oxidation-reduction potentials, which will effect extraction of the precious metals as non-toxic, water-soluble metal salts.

This invention also comprises a composition of matter useful for the extraction of precious metals from ores, which comprises the proportions of sodium bromide, sodium chloride, and potassium monopersulfate having the requisite pH and oxidation/reduction potentials to dissolve precious metals as non-toxic water soluble sodium metal bromides.

In its preferred form, the extraction step is performed at conditions of pH between 3.2 and 3.4 and the oxidation-reduction potential between +750 and +850 millivolts with a slurry mixing time of 4 to 6 hours at an operating temperature of 55° to 90° F.

The metal-rich liquor from the extraction step is treated to separate the precious metals from the slurry solids by the addition of sodium hydroxide and sodium borohydride at a pH between 8.3 and 8.7 and an oxidation-reduction potential between −550 and −650 millivolts to reduce the gold, silver, and the platinum metal bromides to the base metals, and separation of the precipitated metals with conventional wet processing techniques such as filtration. The filtered leach liquor can be reconstituted by electrochemical treatment and additions of requisite amounts of sodium bromide, sodium chloride, and potassium monopersulfate and recycled for reuse with fresh ore. The filtered solids are purified with standard metal separation and recovery procedures.

BRIEF DESCRIPTION OF DRAWINGS

The invention will be described with reference to the FIGURE which is a process diagram of the precious metal recovery method of this invention.

DESCRIPTION OF PREFERRED EMBODIMENTS

The invention comprises an environmentally safe, low-cost method for the extraction of gold, silver, and the platinum metals from precious-metal-bearing ores. The method is broadly applicable to any of many sources of precious-metal-bearing solids such as tailings from previous gold and silver extractions, previously unprocessed ore, etc. It is particularly effective in recovering very finely subdivided metals, unseen by the naked eye, along with those complexed or refractory metals which not only have been difficult but costly to remove. An outstanding feature of the method of this invention is that the processing conditions and controls of the method allow the use of relatively small quantities of low cost non-toxic chemicals, preferably in a closed-loop system, which poses no threat to the environment or ground water.

The FIGURE illustrates the steps of the extraction process of this invention. In the first step, the precious-metal-bearing ore is comminuted to reduce its particle size to a size range passing a 250 mesh screen (65 microns), greatly increasing its surface area to allow optimum exposure to the leaching chemicals. As shown in the FIGURE, the comminution is performed with conventional equipment such as a ball or rod mill 10, using refractory, inert solids, e.g., alumina balls. The ground solids are discharged from the comminution mill into a classification apparatus, such as vibratory screens 12, with the smallest screen passing the desired size range. Any oversized portion is collected in hopper 14 from which it can be returned to the ball mill 10.

The comminuted ore is transferred by a solids conveyor 16 to a tank 18 fitted with a mixer 20 and water is added to prepare a water slurry which contains from 20 to 33 weight percent solids in water. An optimum slurry contains one ton of ore in 500 gallons of water. Fresh, non-saline water is acceptable.

The water slurry of the comminuted ore is then treated with the extractant composition of the invention. That treatment can be practiced batch-wise, by the addition of the extractant to the slurry vessel. As illustrated in the FIGURE, the slurry of comminuted ore is treated in the mixing tank by the addition of the extractant composition consisting of sodium bromide, sodium chloride, and potassium monopersulfate, and requisite chemicals to adjust the treatment pH values and oxidation/reduction potentials of the resultant mixture for the extraction of gold, silver, and the platinum metals as water soluble bromide salts.

Other metals present in the ore, such as copper, lead, and nickel will also be extracted and removed in the succeeding refining process.

The chemicals of the extractant composition, which are added to the slurry, are sodium bromide which is added to provide a concentration from 1.5 to 3.5 weight percent, preferably from 1.8 to 2.5 weight percent, and most preferably about 2 weight percent of the aqueous phase. Sodium chloride is also added at a concentration from 3 to 6 weight percent, preferably from 3.8 to 4.2 weight percent, and most preferably about 4 weight percent of the aqueous phase of the slurry.

The oxidation/reduction potential of the aqueous phase of the slurry is monitored with a millivolt meter, such as manufactured by Ryan-Herco, and potassium monopersulfate is added in small increments until an oxidation-reduction potential of +700 to +900 millivolts, preferably +750 to +850 millivolts, and most preferably about +800 millivolts, is obtained. In the event that the potential exceeds the desired valve, the potential can be reduced by the addition of hydrochloric acid. The pH of the liquid phase should be maintained between 3.0 and 4.0, preferably between 3.2 and 3.6 by addition of hydrochloric acid.

The potassium monopersulfate, under the trade name Oxone, from duPont, offers a distinct advantage over less soluble, dry oxidants such as sodium perborate, particularly at relatively low temperatures. Oxone is a white, free-flowing, granular triple salt with the formula $2KHSO_5 \cdot KHSO_4 \cdot K_2SO_4$ with the active component $KHSO_5$ a minimum of 42.8% with a structural formula:

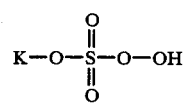

At the preferred proportions of one part sodium bromide to two parts sodium chloride by weight, optimum leaching values are obtained from the minus 250 mesh precious-metal-bearing ores at pH values from 3.2 to 3.6 and oxidation-reduction potential values from +750 to +850 millivolts. Bromine and chlorine are liberated, and the chlorine synergistically oxidizes the precious metal complexes enabling up to 98% of the precious metal to be extracted in the form of water soluble metal bromides.

While monitoring and maintaining the operating parameters (pH 3.2 to 3.6 and the oxidation-reduction potential at +800 to +850 millivolts), the slurry is mixed, with slow agitation, for a period from 3 to about 10, preferably for at least 5 hours. After 5 hours of mixing, the slurry is pumped through a filtering unit 22, to separate a filtrate which contains the precious metal salts which is collected in a holding tank 24 having a mechanical stirrer 26. The tailings are removed at 23, dried and discarded.

The filtrate collected in the holding tank 24 contains the soluble sodium metal bromides, some sodium metal chlorides, along with residual sodium bromide, sodium chloride and potassium sulfate. A solution of sodium borohydride ($NaBH_4$) is slowly added to tank 24 to precipitate the precious metals. The sodium borohydride solution consists of 6 weight percent sodium borohydride, 20 weight percent sodium hydroxide, and 74 weight percent water. Sodium borohydride is a reducing agent which converts the soluble metal cations to the insoluble elemental metals. The sodium borohydride solution is slowly added, with stirring, to the pregnant liquor filtrate in tank 24 starting with one gallon per 500 gallons of filtrate. The filtrate is maintained at a pH from 8.1 to 8.7 and the oxidation-reduction potential is maintained at $-600$, plus or minus 50, millivolts. Under these conditions, a black precipitate of the elemental metals forms, accompanied by release of hydrogen gas by the reduction which bubbles through the aqueous phase. The bubbling of hydrogen gas keeps the precipitate in suspension, and the black coloration of the precipitate fades during stirring of the solution. During the reduction treatment, additional increments of the sodium borohydride solution are added until the black colored suspension is permanent. Mixing is allowed to continue for two hours. If the oxidation-reduction potential exceeds $-800$ millivolts, it can be brought back to $-600$ millivolts with additions of hydrochloric acid.

The black colored suspension is a mixture of the precious metals, which were leached from the ore in the form of soluble sodium metal bromides, along with other metal impurities such as copper, lead, and nickel. The suspension is then filtered through a conventional filtration system 30 whereby the metals are separated from the filtrate, dried and taken to a metal refinery for standard procedures of separation.

The filtrate is pumped to a holding tank 32 called a "barren tank", where it is stored and regenerated for recycling with the next batch of ore. In this closed-loop system, the filtrate is regenerated, using a 500 amp rectifier, by applying 4 volts, direct current, to carbon plated electrodes until an oxidation-reduction potential reading of +800 millivolts is obtained in the liquid.

The following examples will serve to demonstrate the practice of the invention and illustrate the results which are obtained.

EXAMPLE 1

The invention is practiced by adding 500 gallons of water to a 1000 gallon capacity tank to which was also added 2000 pounds of precious-metal-bearing ore having a particle size reduced to minus 250 mesh. The ore had been assayed by atomic absorption, emission spectroscopy and fire assay and found to contain 5.8 ounces of gold, 13.2 ounces silver, 0.41 ounce platinum and 1.54 ounce rhodium per ton.

The resultant slurry was stirred and 40 pounds of sodium bromide (97% technical grade) and 80 pounds sodium chloride (technical grade) were slowly added and the resultant slurry was stirred for 30 minutes, after which 0.25 pound increments of potassium monopersulfate were added, while the oxidation/reduction potential was monitored. The addition of potassium persulfate was continued until the potential reached 800 millivolts and the pH between 3.2 and 3.6. After the addition of 1.5 pounds of potassium monopersulfate the oxidation/reduction potential increased to +900 millivolts, and hydrochloric acid was added to reduce the potential to +810 millivolts. The slurry was stirred for five hours, and monitored every 30 minutes to determine its oxidation/reduction potential and pH. Potassium persulfate and hydrochloric acid were added in slight amounts as necessary to maintain the potential at 800 plus or minus 50 millivolts, and the pH between 3.2 and 3.6.

After five hours, the slurry was filtered and the filtrate was pumped to a 750 gallon holding tank equipped with a stirrer.

The precious metals in the filtrate were recovered by adding one gallon of an aqueous solution of 6 weight percent sodium borohydride and 20 weight percent sodium hydroxide was added. The oxidation/reduction potential of the liquid was adjusted to and maintained at −600 millivolts, plus or minus 50 millivolts and the pH of the liquid was maintained at 8.3 to 8.7 by the addition of sodium borohydride and hydrochloric acid.

After two hours of stirring, the liquid was filtered to recover the precipitate of precious metals. The filtrate was reconstituted for reuse.

The filtered solids were dried and purified to determine that the recovery, per ton of ore, was: 5.64 ounces of gold, 12.6 ounces of silver, 0.38 ounces of platinum, and 1.48 ounces of rhodium.

EXAMPLE 2

A 750-gallon capacity mixing tank was charged with 250 gallons water and 1000 pounds of an ore having a particle size all passing a 250 mesh screen. The ore assayed at 9.7 ounces gold, 14.1 ounces silver and 3.2 ounces rhodium per ton. The resultant slurry was stirred and 20 pounds sodium bromide and 40 pounds sodium chloride were added. After thirty minutes of stirring, the oxidation/reduction potential was adjusted to and maintained at 820, plus or minus 50, millivolts by the addition of 335 grams of potassium persulfate and hydrochloric acid as needed to maintain the pH at 3.4 to 3.7.

After five hours, the slurry was filtered to recover a filtrate which was separated from the leached ore. The filtrate was treated to recover the precious metals by the addition of 2800 milliliters of an aqueous solution of sodium borohydride and increments of hydrochloric acid as necessary to maintain the oxidation/reduction potential at −600, plus or minus, 50 millivolts and the pH at 8.2 to 9.0. The resulting precipitate was separated by filtration, washed, dried and purified to recover 9.3 ounces gold, 13.4 ounces silver and 2.9 ounces rhodium, per ton of ore.

EXAMPLE 3

A 500-gallon capacity mixing tank was charged with 125 gallons water and 500 pounds of volcanic cinders having a particle size all passing a 250 mesh screen. The cinders assayed at 8.8 ounces platinum, 0.45 ounces iridium and 0.32 ounces palladium per ton. The resultant slurry was stirred and 10 pounds sodium bromide, 20 pounds sodium chloride, 230 grams of potassium persulfate and hydrochloric acid were added to maintain the oxidation/reduction potential at 820, plus or minus 50, millivolts and the pH at 3.0 to 3.6.

After five hours, the slurry was filtered to recover a filtrate which was separated from the leached ore. The filtrate was treated to recover the precious metals by the addition of 1400 milliliters of an aqueous solution of sodium borohydride and increments of hydrochloric acid as necessary to maintain the oxidation/reduction potential at −600, plus or minus 50 millivolts and the pH at 8.2. The resulting precipitate was separated by filtration, washed, dried and purified to recover 8.2 ounces platinum 0.04 ounces iridium and 0.29 ounces palladium per ton of ore.

EXAMPLE 4

The preceding example was repeated with 500 pounds of volcanic cinders and gravel which assayed 18.6 ounces platinum, 1.10 ounces iridium and 2.94 ounces osmium per ton. The recovery of precious metals was: 7.9 ounces of platinum, 0.89 ounces iridium and 2.71 ounces osmium, per ton of ore.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. A precious metal recovery method which comprises:
   a. comminuting precious-metal-containing solids to obtain a solids fraction passing a 250 mesh screen;
   b. mixing water with said solids fraction to obtain a slurry of from 20 to 35 weight percent solids in an aqueous phase;
   c. contacting said solids fraction with an extractant composition comprising:
      (1) sodium bromide at a concentration from 1.5 to 3.5 weight percent of the aqueous phase and sodium chloride at a concentration from 3 to 6 weight percent of said aqueous phase; and
      (2) potassium persulfate in an amount sufficient to provide an oxidation-reduction potential in the aqueous phase from +700 to +900 millivolts; and
      (3) hydrochloric acid as necessary to maintain the pH of the aqueous phase between 3.0 and 4.0.

2. The precious metal recovery method of claim 1 including the step of stirring said slurry containing said extractant composition for a period from 3 to about 10 hours.

3. The precious metal recovery method of claim 2 which comprises the additional step of separating the aqueous phase from the solids after said stirring step.

4. The precious metal recovery method of claim 3 wherein said separating step is filtration to recover a filtrate rich in precious metals.

5. The precious metal recovery method of claim 4 including the additional step of precipitating precious metals from said filtrate by the addition thereto of a reducing agent to reduce the oxidation/reduction potential of the filtrate to $-600$, millivolts, or less.

6. The precious metal recovery method of claim 5 wherein said reducing agent is an aqueous solution of sodium borohydride and sodium hydroxide.

7. The precious metal recovery method of claim 6 wherein said aqueous solution contains 6 weight percent sodium borohydride, 20 weight percent sodium hydroxide.

8. The precious metal recovery method of claim 5 wherein the resultant mixture of said filtrate and reducing agent are stirred for a period of 1 to 4 hours to obtain a slurry of precious metal precipitates.

9. The precious metal recovery method of claim 8 including the step of filtering said slurry of precious metal precipitates to recover precious metals from a second filtrate.

10. The precious metal recovery method of claim 9 including the step of regenerating the second filtrate by treatment to elevate its oxidation/reduction potential to $+800$ millivolts or greater, and adding sodium bromide, sodium chloride and potassium persulfate, as necessary to obtain said extractant composition for reuse in the method.

11. The precious metal recovery method of claim 1 wherein said sodium bromide is added to said slurry at a concentration in said aqueous phase from 1.8 to 2.5 weight percent.

12. The precious metal recovery method of claim 11 wherein said sodium bromide is added to said slurry at a concentration in said aqueous phase at 2 weight percent.

13. The precious metal recovery method of claim 1 wherein said sodium chloride is added to said slurry at a concentration in said aqueous phase from 3.8 to 4.2 weight percent.

14. The precious metal recovery method of claim 11 wherein said sodium chloride is added to said slurry at a concentration of 4 weight percent of said aqueous phase.

15. The precious metal recovery method of claim 1 wherein the oxidation/reduction potential of said aqueous phase is maintained at $+750$ to $+850$ millivolts.

16. The precious metal recovery method of claim 1 wherein the oxidation/reduction potential of said aqueous phase is maintained at $+800$ millivolts, 17. The precious metal recovery method of claim 1 wherein said potassium persulfate is a triple salt with the formula: $2KHSO_5.KHSO_4.K_2SO_4$.

* * * * *